(12) United States Patent
Dittmann et al.

(10) Patent No.: US 8,835,004 B2
(45) Date of Patent: Sep. 16, 2014

(54) SINTERING SUPPORT COMPRISING FULLY STABILIZED ZIRCONIA OUTER SURFACE AND CRYSTALLINE PHASE COMPOSITION, AND METHOD OF MAKING THEREOF

(75) Inventors: Rainer K. Dittmann, Munich (DE); Stefan Hoescheler, Munich (DE)

(73) Assignee: 3M Innovative Properties Company, Saint Paul, MN (US)

( * ) Notice: Subject to any disclaimer, the term of this patent is extended or adjusted under 35 U.S.C. 154(b) by 106 days.

(21) Appl. No.: 13/254,083

(22) PCT Filed: Mar. 15, 2010

(86) PCT No.: PCT/US2010/027275
§ 371 (c)(1),
(2), (4) Date: Aug. 31, 2011

(87) PCT Pub. No.: WO2010/107678
PCT Pub. Date: Sep. 23, 2010

(65) Prior Publication Data
US 2011/0318582 A1    Dec. 29, 2011

Related U.S. Application Data

(60) Provisional application No. 61/161,820, filed on Mar. 20, 2009.

(51) Int. Cl.
*B32B 5/16* (2006.01)
*B05D 3/02* (2006.01)
(Continued)

(52) U.S. Cl.
CPC ......... *C04B 41/80* (2013.01); *C04B 2235/5427* (2013.01); *F27D 5/0043* (2013.01); *C04B 2111/00836* (2013.01); *C04B 41/4584* (2013.01); *C04B 2235/528* (2013.01); *C04B 2235/762* (2013.01); *C04B 35/62815* (2013.01); *C04B 35/6281* (2013.01); *C04B 2235/3246* (2013.01); *C04B 2235/72* (2013.01); *C04B 41/009* (2013.01)
USPC ........ 428/403; 427/215; 427/226; 427/443.2; 428/404; 501/103; 501/104

(58) Field of Classification Search
USPC ........... 428/403–406, 702; 106/450; 501/103, 501/104; 427/215, 226, 443.2
See application file for complete search history.

(56) References Cited

U.S. PATENT DOCUMENTS

| 3,876,704 A | 4/1975 | Nakaguchi |
| 4,055,402 A | 10/1977 | Battersby |

(Continued)

FOREIGN PATENT DOCUMENTS

| EP | 0578453 | 1/1994 |
| JP | 06-070658 | 3/1994 |

(Continued)

OTHER PUBLICATIONS

Walter et al, Structure of yttria stabilized zirconia beads produced by gel supported precipitation, J. Mater Sci. (2007) 42:4650-4658. DOI 10.1007/s10853-006-0515-8.*

(Continued)

*Primary Examiner* — Holly Le
(74) *Attorney, Agent, or Firm* — Qiang Han; 3M Innovative Properties Company (57) ABSTRACT

A sintering support comprising a fully stabilized zirconia outer surface; wherein the sintering support withstands sintering a ceramic part in contact with the outer surface without adhesion between the outer surface and the ceramic part, and methods of making and using the sintering support are disclosed.

23 Claims, 3 Drawing Sheets

(51) Int. Cl.
*C04B 35/48* (2006.01)
*C04B 35/64* (2006.01)
*C04B 41/80* (2006.01)
*F27D 5/00* (2006.01)
*C04B 41/45* (2006.01)
*C04B 35/628* (2006.01)
*C04B 41/00* (2006.01)
*C04B 111/00* (2006.01)

(56) References Cited

U.S. PATENT DOCUMENTS

| | | | |
|---|---|---|---|
| 4,435,303 A | 3/1984 | Abadi | |
| 4,539,233 A | 9/1985 | Melotik | |
| 4,797,220 A | 1/1989 | Miller | |
| 4,903,509 A * | 2/1990 | Christ et al. | 68/5 C |
| 4,906,509 A | 3/1990 | Nishio | |
| 5,407,453 A | 4/1995 | Pierce-Ruhland | |
| 5,409,415 A | 4/1995 | Kawanami | |
| 5,603,875 A * | 2/1997 | Giller et al. | 264/607 |
| 6,709,694 B1 | 3/2004 | Suttor | |
| 2008/0286718 A1 | 11/2008 | Franke | |

FOREIGN PATENT DOCUMENTS

| | | |
|---|---|---|
| JP | 06-183833 | 7/1994 |
| JP | 10-237417 | 9/1998 |
| JP | 2002-104874 | 10/2002 |
| WO | WO 91/05742 | 5/1991 |
| WO | WO 94/29092 | 12/1994 |
| WO | WO 2008/098157 | 8/2008 |

OTHER PUBLICATIONS

Walter et al., 2007, *J. Mater. Sci.*, 42:4650-4658 "Structure of yttria stabilized zirconia beads produced by gel supported precipitation".

* cited by examiner

SINTERING SUPPORT COMPRISING FULLY STABILIZED ZIRCONIA OUTER SURFACE AND CRYSTALLINE PHASE COMPOSITION, AND METHOD OF MAKING THEREOF

CROSS REFERENCE TO RELATED APPLICATIONS

This application is a national stage filing under 35 U.S.C. 371 of PCT/US2010/027275, filed Mar. 15, 2010, which claims priority to U.S. Provisional Application No. 61/161,820, filed Mar. 20, 2009, the disclosure of which is incorporated by reference in its/their entirety herein.

BACKGROUND

Indirect dental restorations are typically fabricated outside of the mouth using a dental impression and/or digital methodologies and may be permanently bonded to a prepared tooth or other dental structure with a dental cement or the like. Such restorations include, for example, veneers, onlays, inlays, bridges, crowns, and many others. Ceramic restorations are particularly desirable, because their color and translucency can mimic natural tooth enamel.

Digital technologies have facilitated the use of ceramics, including, for example, zirconium oxide, in these applications. In one example, such methods include optically scanning the three-dimensional surface of a dentition impression. The resulting captured shape data may be modified to take into account downstream processing effects such as shrinkage. After calculating numerical control data from the shape data, the numerical control data is sent to a milling machine to prepare a ceramic blank fitting the shape data. The resulting ceramic blank is then sintered to provide the finished ceramic restoration.

Because the ceramic material shrinks during sintering, certain sintering supports have been devised with the aim of reducing resistance to the shrinkage occurring in the ceramic restoration, caused by the sintering support. Examples of such sintering supports include aluminum oxide pegs, platinum alloy hangers, and certain swing-type suspension systems. In another example, a bed of ceramic beads has been used as a sintering support upon which the ceramic restoration rests during the sintering. However, in some instances, problems such as poor fit and discoloration of the restoration have been encountered.

There is, therefore, a continuing need for improved sintering processes and materials for preparing indirect dental ceramic restorations.

SUMMARY

A sintering support has now been found which does not adhere to or contaminate a ceramic part, such as an alumina or zirconia part or article, supported thereon during sintering. In one embodiment, there is provided a sintering support comprising a fully stabilized zirconia outer surface;

wherein the sintering support withstands sintering a ceramic part in contact with the outer surface without adhesion between the outer surface and the ceramic part.

In another embodiment, there is provided a method of preparing a sintering support, the method comprising:
providing a zirconia base having an outer surface;
contacting the outer surface of the zirconia base with a solution of a precursor of at least one stabilizing element in a solvent;
evaporating the solvent to provide the zirconia base having the outer surface coated with the precursor of the at least one stabilizing element; and
sintering the zirconia base having the outer surface coated with the precursor of the at least one stabilizing element at a temperature of at least 1200° C. to provide a sintering support having a fully stabilized zirconia outer surface.

In another embodiment, there is provided a method of sintering a dental restoration, the method comprising:
supporting the dental restoration on the sintering support of any one of the above embodiments or any one of the embodiments thereof described herein; wherein the dental restoration contacts the stabilized zirconia outer surface of the sintering support; and
sintering the dental restoration.

DEFINITIONS

As used herein, the term "fully stabilized zirconia outer surface" and various forms thereof refers to an outer surface of a sintering support which contains an amount of chemical element(s) to stabilize zirconia sufficiently in the cubic phase structure and which does not adhere to another surface containing zirconia after being subjected to a temperature of 1500° C. for 120 minutes with the surfaces in close proximity or in contact with each other. When the sintering support is in the form of beads, the beads are free-flowing after being subjected to the temperature of 1500° C. for 120 minutes. Although this temperature and time can be conveniently used to assess whether or not the sintering support has a fully stabilized zirconia outer surface; sintering supports of the present invention may be used at other temperatures and time as disclosed herein without adherence to ceramic surfaces, including surfaces of the sintering support.

As used herein, the terms "sintered" and "sintering" (also known as fired or firing) refer to a reduction in size and/or number or the elimination of inter-particle pores in a granular structure comprised of particles by heating without melting.

As used herein, the term "sintering support" or variations thereof refers to a structure upon which a ceramic part or ceramic article, such as a dental restorative, can rest while undergoing a sintering process.

As used herein, the term "zirconia" refers to various stoichiometries for zirconium oxides, most typically $ZrO_2$, and may also be known as zirconium oxide or zirconium dioxide. The zirconia may contain oxides of other chemical elements, such as CaO, MgO, SrO, BaO, $Y_2O_3$, a rare earth oxide, and combinations thereof, as further described herein.

As used herein, the term "major phase" refers to a crystal phase that is present in the crystalline phase composition of at least the outer surface of the sintering support in an amount such that this phase comprises the highest weight fraction of the crystalline phase composition.

As used herein, the term "grain size" refers to the largest dimension of the primary crystal particles or grains comprising the outer surface of the sintering support.

As used herein, unless otherwise indicated, "a", "an", "the", "at least one", and "one or more" are used interchangeably.

The term "comprising" and variations thereof (e.g., comprises, having, containing, etc.) do not have a limiting meaning where these terms appear in the description and claims.

Also herein, the recitations of numerical ranges by endpoints include all numbers subsumed within that range (e.g., at least 0.5 mm includes 0.50, 0.55, 0.60, 0.675, 0.7, 1, 1.5, 2, 3 mm, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used individually and in various combinations. In each instance, the recited list serves only as a representative group and should not be interpreted as an exclusive list.

DETAILED DESCRIPTION OF ILLUSTRATIVE EMBODIMENTS OF THE INVENTION

Sintering supports provided herein can be in any form suitable for supporting a ceramic part during sintering of that part. Preferred examples include a tray, a plurality of rods, a plurality of beads, and the like, and combinations thereof. The tray comprises an outer surface upon which a ceramic part or ceramic article can rest during sintering. The surface may be flat or structured to minimize the surface area in contact with the ceramic part during a sintering process. The plurality of rods can also provide a surface with minimal contact between the ceramic part and the sintering support. In addition, the rods can roll, thereby providing a degree of freedom to move as the ceramic part shrinks during sintering. Likewise, the plurality of beads can be used effectively to uniformly support the individual shaped ceramic part and minimize the surface area of the support contacting the ceramic part. Moreover, in certain embodiments, the beads are substantially spherical, such that they can rotate in any direction during shrinkage of the ceramic part. The ability to roll or rotate as the ceramic part shrinks during sintering can further help allow the shrinkage to take place without resistance caused by contact with the surface of the support.

Several types of ceramic beads are commercially available and were considered for use as a sintering support in sintering dental zirconia restorations but found unusable. For example, dense tetragonal zirconia beads strongly sintered together, adhered to the dental restoration, and prevented free shrinkage of the restoration. In another example, yellow colored hollow zirconia beads of lower purity contaminated the dental restoration and cause a discoloration. In a further example, hollow alumina beads contaminated the zirconia restoration by the alumina adhering to the restoration, increasing the opacity, and cause issues in the veneering of the zirconia due to different coefficients of thermal expansion.

However, a sintering support having a doped zirconia surface has now been found which does not adhere to a ceramic part, for example, a zirconia or alumina dental restoration, during sintering nor contaminate the ceramic part by discoloration or by material adhering to the ceramic part. As a result, in some embodiments, a wide range of ceramic parts, such as dental restorations, including large span restorations, can be prepared with accurate fit.

In one embodiment, therefore, there is provided a sintering support comprising a fully stabilized zirconia outer surface; wherein the sintering support withstands sintering a ceramic part in contact with the outer surface without adhesion between the outer surface and the ceramic part. The ceramic part (or ceramic article), in certain embodiments, is preferably a ceramic dental restoration, for example, a zirconia or alumina restoration. Because of its biocompatibility, strength, and fracture toughness, zirconium oxide is a ceramic of choice in a variety of dental restoratives. In certain of these embodiments, preferably the restoration is a zirconia dental restoration.

The sintering, in certain embodiments, is preferably carried out at a temperature above 1300° C. For certain of these embodiments, the sintering is carried out at a temperature above 1350° C. or above 1400° C. For certain of these embodiments, the sintering is at a temperature not greater than 1650° C., preferably not greater than 1600° C. Accordingly, for certain embodiments, the sintering support withstands sintering at any of these temperatures and temperature ranges without adherence to a ceramic part or another surface of the sintering support. For certain of these embodiments, preferably the temperature at which the sintering support withstands the sintering is above 1300° C. to 1600° C.

The fully stabilized zirconia outer surface of the sintering support, in certain embodiments, extends into the support on average at least 2 micrometers, preferably at least 3 micrometers, more preferably at least 4 micrometers, and most preferably at least 6 micrometers. These parameters may constitute an average thickness of the stabilized zirconia outer surface or the thickness of the stabilized zirconia outer surface of one or more representative examples of such outer surfaces. The fully stabilized zirconia need not be limited to the outer surface of the sintering support and may, in certain embodiments, extend partway through or even throughout the sintering support.

For certain embodiments, including any one of the above embodiments, at least the stabilized zirconia outer surface comprises a crystalline phase composition, at least 40 percent by weight of which is a stabilized zirconia-containing crystalline phase; wherein the stabilized zirconia-containing crystalline phase contains at least one stabilizing element in an amount sufficient to stabilize the zirconia-containing crystalline phase at the outer surface; and wherein the stabilized zirconia-containing crystalline phase is selected from the group consisting of a cubic zirconia structure, a pyrochlore structure, a perovskite structure, and a combination thereof. These zirconia-containing crystalline phases at such levels reduce the sintering activity of the sintering support, and thereby prevent undesired adherence to a ceramic article contacting the support during sintering.

For certain embodiments, the stabilizing element is selected from the group consisting of Ca, Mg, Sr, Ba, a rare earth element, or a combination thereof. Rare earth elements include Sc, Y, and the lanthanides, also known as lanthanoids (i.e., the elements having atomic numbers 57 through 71). Doping a zirconia structure (e.g., zironcia sintering support or zirconia base component of a sintering support) with at least one such element results in a solid solution, at least on the surface of the zirconia structure, which includes at least one stabilized zirconia-containing crystalline phase.

In the stabilized zirconia-containing crystalline phase, the stabilizing element is in the form of an oxide of the stabilizing element. For certain embodiments, including any one of the above embodiments which includes a cubic zirconia structure, the cubic zirconia structure is stabilized by CaO, MgO, SrO, BaO, a rare earth oxide, or a combination thereof. For certain of these embodiments, the rare earth oxide is $Y_2O_3$, $CeO_2$, $Sc_2O_3$ or a combination thereof.

For certain embodiments, including any one of the above embodiments which includes a pyrochlore structure, the pyrochlore structure has the formula $La_2Zr_2O_7$.

For certain embodiments, including any one of the above embodiments which includes a perovskite structure, the perovskite structure includes $CaZrO_3$, $MgZrO_3$, $YZrO_3$, $SrZrO_3$, $BaZrO_3$, or a combination thereof.

The stabilized zirconia-containing crystalline phase, in certain embodiments, is preferably present as the major phase in at least the outer surface of the sintering support. For certain embodiments, including any one of the above embodiments, at least the stabilized zirconia outer surface comprises a crystalline phase composition, wherein preferably greater than 60 percent, more preferably greater than 80 percent by weight of the crystalline phase composition is the stabilized zirconia-containing crystalline phase.

For certain embodiments, including any one of the above embodiments, the stabilized zirconia-containing crystalline phase comprises cubic zirconia stabilized by CaO, MgO, SrO, BaO, a rare earth oxide, or a combination thereof. For certain of these embodiments, preferably the cubic zirconia is stabilized by CaO, MgO, $Y_2O_3$, $CeO_2$, or a combination thereof, more preferably by CaO, MgO, $Y_2O_3$, or a combination thereof. For certain of these embodiments, the cubic zirconia is stabilized by CaO.

The sintering activity of the sintering support is not only significantly reduced by the presence of a relatively high level of the stabilized zirconia-containing crystalline phase, but also by using a relative large grain size. As described infra, grain growth can be induced by applying a stabilizing element, for example, in the form of a precursor, such as a salt of the stabilizing element, to the outer surface and then sintering. For certain embodiments, including any one of the above embodiments, the stabilized zirconia outer surface has a grain size greater than 1 micrometer. For certain of these embodiments, preferably the grain size is at least 2 micrometers, more preferably at least 3 micrometers.

As indicated above, the fully stabilized zirconia outer surface has been found to extend into the sintering support on average at least 2 micrometers. This outer surface then comprises a portion of the total mass of the sintering support. By measuring the thickness of the fully stabilized zirconia outer surface, mass of the outer surface can be estimated in order to determine the amount of stabilizing element or oxide thereof that is in this outer surface. For certain embodiments, including any one of the above embodiments, the stabilized zirconia outer surface comprises at least 5 mole percent, preferably at least 8 mole percent, more preferably at least 10 mole percent, 20 mole percent, 30 mole percent, 40 mole percent, or even 50 mole percent of the at least one stabilizing element. The mole percent is based upon the total moles of zirconia in the composition of the outer surface. For certain of these embodiments, the at least one stabilizing element is selected from the group consisting of Ca, Mg, Sr, Ba, Y, Sc, a lanthanide, and a combination thereof. For certain of these embodiments, the at least one stabilizing element includes Ca. As indicated above, the stabilizing element is typically present in the outer surface of the sintering support in an oxide form.

For certain embodiments, including any one of the above embodiments, the stabilized zirconia outer surface is essentially free of any contaminating element. Such contaminants in the sintering support can cause undesired discoloration of a ceramic part during sintering processes. For certain of these embodiments, the contaminating element is selected from the group consisting of iron, manganese, vanadium, cobalt, copper, nickel, and combinations thereof.

As indicated above, the sintering supports provided herein can be in any form suitable for supporting a ceramic part during a process of sintering the ceramic part or article. For certain embodiments, including any one of the above embodiments, preferably the sintering support is selected from the group consisting of a tray, a plurality of rods, and a plurality of beads. Because beads can rotate in any direction, they may be used as a support for a wide range of ceramic parts, for example, ceramic dental restorations, which must shrink significantly in several directions to arrive at the final, densified restoration. For certain of these embodiments, preferably the support is a plurality of beads.

For certain embodiments, including any one of the above embodiments where the sintering support is a plurality of beads, the amount of the at least one stabilizing element present in the stabilized zirconia outer surface of such beads is at least 0.10 percent by weight of the beads. For certain of these embodiments, preferably the at least one stabilizing element is present in the outer surface in an amount of at least 0.15 percent, at least 0.30 percent, or at least 0.60 percent by weight of the beads.

The sintering support is structured to provide sufficient contact points to support a wide range of ceramic dental restoration configurations, including large span zirconia restorations. When rods or beads are the sintering support, they are distributed on a flat surface, such that the structure of the sintering support upon which a dental restoration rests is defined by the diameter and length of the rods and in the case of the beads, the diameter of the beads.

For certain embodiments, including any one of the above embodiments where the sintering support is a plurality of beads, the beads have a diameter of at least 0.5 mm.

For certain embodiments, including any one of the above embodiments where the sintering support is a plurality of beads, the beads have a diameter of not more than 3 mm.

For certain embodiments, including any one of the above embodiments where the sintering support is a plurality of beads, the beads do not adhere to each other during sintering.

To provide optimum ease of the rods rolling and the beads rotating, and, thus, capable of freely flowing, in certain embodiments, the rods and the beads have a circular cross-section. For certain embodiments, including any one of the above embodiments where the sintering support is a plurality of beads, the beads are substantially spherical. Substantially spherical beads have a sphericity of at least 0.75, preferably at least about 0.80, more preferably at least about 0.90. Sphericity can be determined by well known methods. Preferably, the bead sphericity is defined as the ratio of the surface area of a sphere having the same volume as the bead ($S_V$) to the surface area of the bead ($S_A$). This is shown in the following equation, wherein $\psi$ is sphericity:

$$\psi = \frac{S_V}{S_A} \leq 1$$

In another embodiment, there is provided method of preparing a sintering support, the method comprising providing a zirconia base having an outer surface; contacting the outer surface of the zirconia base with a solution of a precursor of at least one stabilizing element in a solvent; evaporating the solvent to provide the zirconia base having the outer surface coated with the precursor of the at least one stabilizing element; and sintering the zirconia base having the outer surface coated with the precursor of the at least one stabilizing element at a temperature of at least 1200° C. to provide a sintering support comprising a fully stabilized zirconia outer surface.

For certain embodiments, the zirconia base is preferably comprised of tetragonal zirconia. The zirconia base may be in the form of a flat sheet, such as a tray, a plurality of rods, a plurality of beads, or the like, or a combination thereof. The precursor of the at least on stabilizing element is applied to the outer surface of the zirconia base, and during sintering the at least one stabilizing element is doped into the tetragonal zirconia structure, resulting in a solid solution at least on the outer surface which has a large amount of a stabilized zirconia-containing crystalline phase. The stabilized zirconia-containing crystalline phase contains the at least one stabilizing element in an amount sufficient to stabilize the zirconia-containing crystalline phase at the outer surface; and the stabilized zirconia-containing crystalline phase is selected from the group consisting of a cubic zirconia structure, a pyrochlore structure, a perovskite structure, and a combination thereof.

For certain embodiments, including any one of the above method embodiments, the precursor is selected from the group consisting of a salt, an alcoholate, a base, an acid, a sol, or a combination thereof; and wherein the precursor comprises the at least one stabilizing element, wherein the precursor is dissolved or dispersed in the solvent, and wherein the solvent is water, an organic solvent, or a combination thereof. For certain of these embodiments, the precursor is a salt of the at least one stabilizing element. For certain of these embodiments, the solvent is water, a $C_{1-4}$ alcohol, or a combination thereof. For certain of these embodiments, the salt is dissolved in water, a $C_{1-4}$ alcohol, or a combination thereof. A $C_{1-4}$ alcohol includes any of the alcohols having one to 4 carbon atoms, such as methanol, ethanol, n-propanol, isopropanol, butanol, isobutanol, tert-butanol, ethylene glycol, glycerol, and the like. For certain of these embodiments, the salt is dissolved in water.

For certain embodiments, including any one of the above method embodiments, the at least one stabilizing element is selected from the group consisting of Ca, Mg, Sr, Ba, Y, Sc, a lanthanide, and a combination thereof. For certain of these embodiments, the at least one stabilizing element is selected from the group consisting of Ca, Y, Mg, Ce, La, and a combination thereof. For certain embodiments, including any one of the above method embodiments, the precursor is selected from the group consisting of a soluble calcium-containing compound, magnesium chloride, lanthanum nitrate, cerium oxide sol, yttrium oxide sol, and a combination thereof. For certain of these embodiments, preferably the at least one stabilizing element is selected from the group consisting of Ca, Y, Mg, and a combination thereof. For certain of these embodiments, the at least one stabilizing element includes Ca. For certain of these embodiments, the at least one stabilizing element is Ca. For certain of these embodiments, the precursor comprises a soluble calcium salt. For certain of these embodiments, the soluble calcium salt is selected from the group consisting of calcium chloride, calcium acetate, calcium gluconate, calcium nitrate, and a combination thereof.

For certain embodiments, the precursor may be selected such that the precursor melts before decomposing. This may support a liquid phase reaction on at least the outer surface of the sintering support during its preparation. For certain embodiments, the precursor is calcium chloride.

For certain embodiments, including any one of the above method embodiments, after sintering, the outer surface comprises a crystalline phase composition, at least 40 percent by weight of which is a stabilized zirconia-containing crystalline phase. As indicated above, this stabilized zirconia-containing crystalline phase is selected from the group consisting of a cubic zirconia structure, a pyrochlore structure, a perovskite structure, and a combination thereof. For certain of these embodiments, the outer surface comprises the crystalline phase composition, at least 40 percent by weight of which is the cubic zirconia crystal structure. For certain of these embodiments, preferably the outer surface comprises the crystalline phase composition, at least 50, at least 60, or at least 80 percent by weight of which is the cubic zirconia crystal structure.

The amount of the at least one stabilizing element present at the outer surface of the sintering support may influence the thickness of the fully stabilized zirconia outer surface and the degree to which the sintering activity of the sintering support is reduced. For certain embodiments, including any one of the above embodiments, preferably the outer surface of the sintering support comprises at least 5 mole percent of the at least one stabilizing element, based upon the total moles of zirconia in the composition of the outer surface. For certain of these embodiments, the outer surface comprises at least 8 mole percent of the at least on stabilizing element. For certain of these embodiments, more preferably the outer surface of the sintering support comprises at least 10 mole percent, 20 mole percent, 30 mole percent, 40 mole percent, or even 50 mole percent of the at least one stabilizing element. The only limitation as to the amount of stabilizing element at the outer surface is that it is part of the crystalline phase composition and not free at the outer surface, such as a contaminating particle which could adversely affect a ceramic part, should the part come in contact with the particle.

For certain embodiments, including any one of the above embodiments of the sintering support or the method of preparing the sintering support, the sintering support has a fully stabilized zirconia outer surface having an average thickness of at least 2 micrometer. For certain of these embodiments, the average thickness is at least 3 micrometers, at least 4 micrometers, or at least 6 micrometers. There is no limitation as to the thickness of the fully stabilized zirconia outer surface, since the fully stabilized zirconia can extend deeply into the sintering support or comprise an entire thickness of the support or the whole support. In the method described herein for making the sintering support, as the amount of stabilizing element precursor coated on outer surface is increased, the amount of stabilizing element in and the thickness of the resulting fully stabilized zirconia outer surface increases.

For certain embodiments, including any one of the above method embodiments, after the sintering step, the outer surface has a grain size greater than 1 micron. As indicated above, a large grain size decreases the sintering activity of the sintering support. Sintering at higher temperatures can increase grain growth as well as the rate of grain growth and may effect an even greater decrease in sintering activity. Accordingly, for certain of these embodiments, preferably the sintering temperature is at least 1300° C., 1400° C., or 1500° C., or up to 1600° C. For certain of these embodiments, preferably the grain size is at least 2 microns, more preferably at least 3 microns.

For certain embodiments, including any one of the above method embodiments, preferably, after sintering, the outer surface is essentially free of any contaminating element as described above for the sintering support.

For certain embodiments, including any one of the above method embodiments, the sintering support is selected from the group consisting of a tray, a plurality of rods, and a plurality of beads. For certain of these embodiments, the sintering support is a plurality of rods, a plurality of beads, or a combination thereof. For certain of these embodiments, preferably the sintering support is a plurality of beads. While sintering to provide the fully stabilized zirconia outer surface, zirconia base surfaces in contact with each other, such as rods or beads in contact with each other, may adhere together. However these adherences can be readily undone and the zirconia base surfaces can be separated from each other by compressing, agitating, or otherwise disrupting the adherences. For certain of these embodiments, the method further comprises separating the beads from each other after sintering. The resulting sintering support beads do not adhere to each other during sintering. When the resulting sintering support beads are subsequently used as a support for a ceramic part, during and after sintering the ceramic part, the beads remain freely flowing and do not adhere to each other.

For certain embodiments, including any one of the above method embodiments where the sintering support is the plurality of beads, the solution of the precursor contains a sufficient amount of the precursor so that the at least one stabilizing element is present in the outer surfaces of the beads an amount of at least 0.10 percent by weight of the beads. For certain of these embodiments, preferably the solution of the precursor contains a sufficient amount of the precursor so that the at least one stabilizing element is present in the outer surface an amount of at least 0.15 percent, at least 0.30 percent, or at least 0.50 percent by weight of the beads.

For certain embodiments, including any one of the above method embodiments where the sintering support is the plurality of beads, the beads have a diameter of at least 0.5 mm. For certain of these embodiments, the beads have a diameter of not more than 3 mm. For certain of these embodiments, the beads are substantially spherical, for example, with a sphericity of at least 0.75 or preferably at least 0.90.

In another embodiment, there is provided a method of sintering a dental restoration, the method comprising supporting the dental restoration on the sintering support of any one of the embodiments of a sintering support described above or on the sintering support prepared by the method of any one of the method embodiments described above; wherein the dental restoration contacts the stabilized zirconia outer surface of the sintering support; and sintering the dental restoration. The resulting dental restoration, for example, a zirconia dental restoration, does not adhere to the sintering support and in certain embodiments, preferably is not contaminated by the sintering support. For example, using XRD, SEM, and/or optical measurements, no difference may be observed between a zirconia article sintered in direct contact with the sintering support and a corresponding zirconia article sintered without contact with the support.

For certain embodiments, sintering the dental restoration is carried out at a temperature above 1300° C. For certain of these embodiments, the sintering temperature is above 1400° C. For certain of these embodiments, the sintering temperature is up to 1600° C. For certain of these embodiments, the sintering temperature is between 1400° C. and 1600° C. For certain of these embodiments the sintering temperature is at about 1500° C. The sintering may be conveniently carried out by starting at room temperature and increasing the temperature at a rate of 10 K per minute. The dental restoration may be held at the sintering temperature for a time period required for the particular restoration, for example, 60 minutes.

Because the sintering support does not adhere to the dental restoration during sintering, the restoration can shrink without appreciable resistance caused by contact with the sintering support. When the sintering support is a plurality of beads, the ability of the beads to rotate may further reduce any resistance to shrinkage that may be caused by contact between the restoration and the support surface. Accordingly, for certain embodiments, the dental restoration shrinks during sintering without the contact between the dental restoration and the stabilized zirconia outer surface causing an appreciable resistance to the shrinkage.

For certain embodiments, including any one of the above embodiments of the method of sintering a dental restoration, the beads do not adhere to each other during sintering.

For certain embodiments, including any one of the above embodiments of the method of sintering a dental restoration, the sintering support does not contaminate the dental restoration by a material adhering to the dental restoration. For certain of these embodiments, the sintering support does not contaminate the dental restoration by discoloring the dental restoration.

For certain embodiments, including any one of the above embodiments of the method of sintering a dental restoration, the dental restoration is selected from the group consisting of a crown, a bridge, a framework, an abutment, an inlay, an onlay, an implant, and an orthodontic bracket.

Objects and advantages of this invention are further illustrated by the following examples, but the particular materials and amounts thereof recited in these examples, as well as other conditions and details, should not be construed to unduly limit this invention.

EXAMPLES

All parts, percentages, ratios, etc. in the examples and the specification are by weight, unless noted otherwise.

Test Methods

X-Ray Diffraction (XRD) Pattern Analysis for Sintering Support Outer Surface Sample Preparation:

Tetragonal zirconia beads (100 g) having an average diameter of 1 mm (YTZ zirconia grinding media, produced from yttria-stabilized zirconia powder by Nikkato Corporation, Japan) were mixed with the salt or sol solution in a glass beaker by hand mixing for 30 s using a polyamide spatula. The resulting mixtures were dried at 90° C. in a drying oven for 2.5 hours, during which time the drying procedure was interrupted 5 times for 30 s for additional mixing by hand. The resulting dried mixture was screened (2 mm screen) and transferred to a alumina crucible. The resulting beads were fired for 2 h at 1500° C. and then screened (2 mm screen).
Data Collection:

A flat layer of the above beads were fixed on a sample holder and measured with a Bruker D8 Discover (Bruker, Germany) in Bragg-Brentano Geometry from 10° to 90° 2-Theta. Ni and CuK beta filtered Cu K alpha radiation was used. Qualitative phase analyses were done with Diffrac Plus Evaluation Software and quantitative Rietveld analyses were done by Topas Structure Database Software.
Scanning Electron Microscopy of Sintering Support Outer Surface Electron microscope analyses were carried out with a Leo 1530 VP FE-SEM (Carl Zeiss SMT AG [formerly Leo Elektronenmikroskopie GmbH], Germany) on bead surfaces and cross sections to provide scanning electron micrographs (SEM's) of these structures.

Examples 1-3

Preparation of Sintering Support Beads with Calcium Chloride

Aqueous solutions of calcium chloride were prepared by dissolving 0.15 g, 0.25 g, and 1.0 g $CaCl_2$ each in 20 mL of deionized water. Each solution was then mixed with 50 g of tetragonal zirconia beads having an average diameter of 1 mm (YTZ zirconia grinding media, produced from yttria-stabilized zirconia powder by Nikkato Corporation, Japan). The resulting concentrations of Ca in each mixture was 0.11, 0.18, and 0.72 percent by weight, respectively, based upon the mass of the beads (corresponding to a CaO weight percent in each mixture of 0.15, 0.25, and 1.0, respectively).

The solvent in each mixture was evaporated by heating at 80° C. in a drying oven, during which time the beads were periodically mixed to keep the calcium chloride homogeneously distributed on the bead surfaces. The resulting dried calcium chloride coated beads from each mixture were sintered at 1500° C. for 120 minutes. During sintering, a phase transformation at the bead surfaces took place and a large grain growth occurred. After sintering, the beads were separated from each other by crunching with a pestle.

Each of the resulting batches of doped beads was evaluated for any remaining sintering activity by subjecting the beads to another sintering at 1500° C. for 120 minutes. No sintering activity was indicated when the resulting beads were free flowing, and no bead agglomerates were observed. The presence of bead agglomerates was determined by pouring the beads of 1 mm diameter through a sieve with a mesh size of 2 mm. Beads with a Ca concentration of 0.11 weight percent showed a minor amount of agglomerates. No agglomerates were observed in the beads with the Ca concentrations of 0.18 and 0.72 weight percent.

Figure 3:
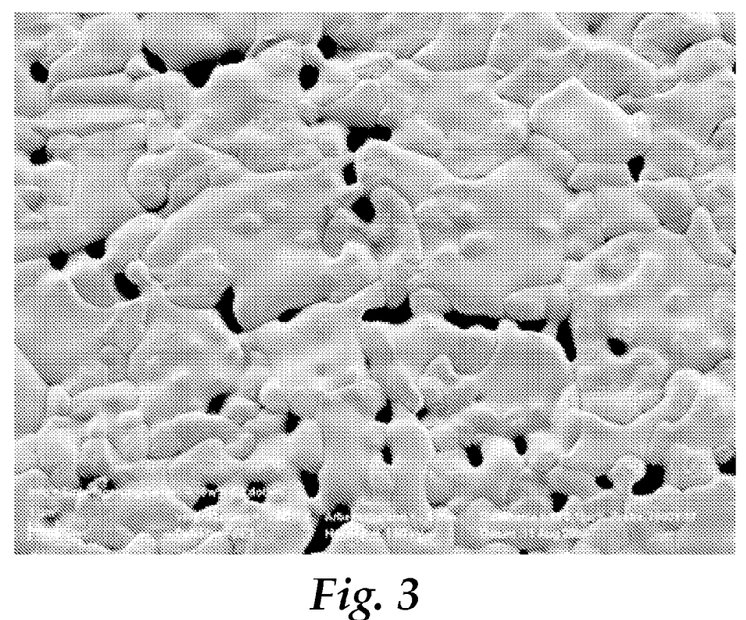
FIG. 3 is a scanning electron microscopy (SEM) image of an exemplary zirconia sintering support with a calcium-doped outer surface having a grain size greater than 1 micrometer.

An SEM image of a surface of a representative bead with the 0.18 weight percent concentration of Ca was obtained and is shown in FIG. 3. The calcium-doped outer surface was found to have a grain size greater than 1 micrometer. The average grain size determined by a lineal intercept procedure (according to ASTM-E112-96) was at least 2.5 micrometers and departed from a uniform equiaxed form.

Examples 4-6

Preparation of Sintering Support Beads with Additional Calcium Concentrations

Aqueous solutions of calcium chloride were prepared by dissolving 0.1 g, 0.55 g, and 1.0 g $CaCl_2$ each in 20 mL of deionized water. Each solution was then hand mixed for 30 s in a glass beaker with 50 g of tetragonal zirconia beads having an average diameter of 1 mm (YTZ zirconia grinding media, produced from yttria-stabilized zirconia powder by Nikkato Corporation, Japan). The resulting concentrations of Ca, calculated as CaO, in each mixture was 0.10, 0.55, and 1.0 percent by weight, respectively, based upon the mass of the beads. The corresponding CaO concentrations in mole percent were 0.22, 1.20, and 2.20, respectively.

The solvent in each mixture was evaporated by heating at 90° C. in a drying oven for 2.5 hours, during which time the drying procedure was interrupted 5 times for 30 s for additional mixing by hand to keep the calcium chloride homogeneously distributed on the bead surfaces. The resulting dried mixture was screened (2 mm screen) and transferred to an alumina crucible. The resulting dried calcium chloride coated beads from each mixture were sintered at 1500° C. for 120 minutes. During sintering, a phase transformation at the bead surfaces took place and a large grain growth occurred. After sintering, the beads were separated from each other by crunching with a pestle and then screened (2 mm screen).

Each of the resulting batches of doped beads was evaluated for any remaining sintering activity by subjecting the beads to another sintering at 1500° C. for 120 minutes. No sintering activity was indicated when the resulting beads were free flowing, and no bead agglomerates were observed. The presence of bead agglomerates was determined by pouring the beads of 1 mm diameter through a sieve with a mesh size of 2 mm. Beads with a CaO concentration of 0.10 weight percent showed a minor amount of agglomerates. No agglomerates were observed in the beads with the CaO concentrations of 0.55 and 1.0 weight percent.

Figure 1:
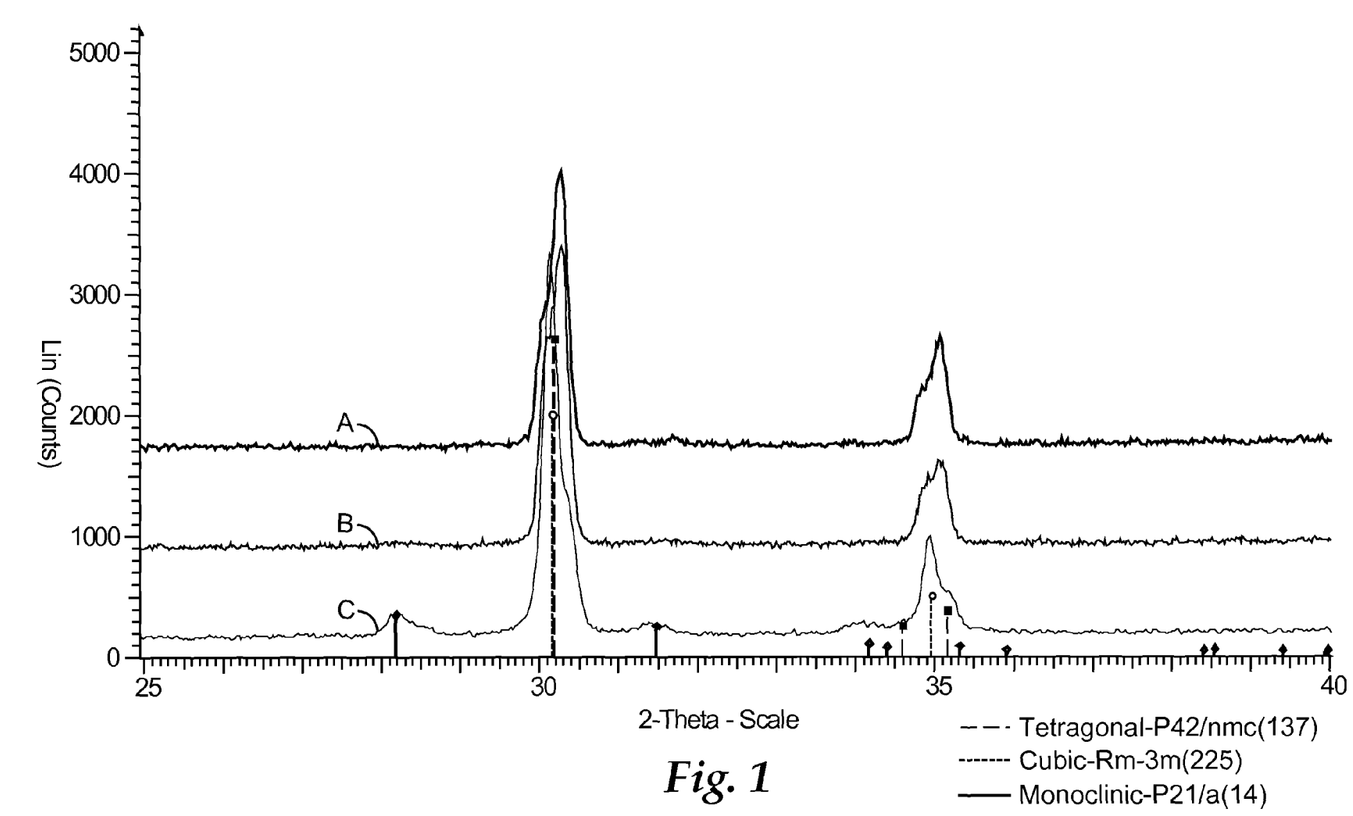
FIG. 1 is a representative x-ray diffraction pattern of some exemplary zirconia sintering supports with fully stabilized outer surfaces having cubic zirconia as the major phase of their outer surfaces' crystalline phase composition.

An x-ray diffraction pattern analysis was carried out on the beads with each of the CaO concentrations. The results are shown in FIG. 1, indicating that the beads at each CaO concentration had a fully stabilized outer surface with cubic zirconia as the major phase of its crystal structure. The amounts of the crystalline phases found are shown in the following Table 1. The x-ray diffraction pattern plots A and B in FIG. 1 are shifted with respect to the Y axis from each other and from x-ray diffraction pattern plot C to more easily differentiate these plots. While the numbers on the Y axis apply to plot C as shown, it is understood that the Y axis numbers are to be shifted appropriately with respect to plots A and B in order to directly apply to each of these plots, respectively.

TABLE 1

| | | | Fully Stabilized Outer Surface Composition | | |
|---|---|---|---|---|---|
| Example | Plot in FIG. 1 | CaO Wt-% | Tetragonal $ZrO_2$ | Cubic $ZrO_2$ | Monoclinic $ZrO_2$ |
| | | | ° Rietveld Analysis | | |
| 4 | A | 1.0 | 0 | ~100% | 0 |
| 5 | B | 0.55 | 0 | ~85% | ~15% |
| 6 | C | 0.1 | ~39% | ~41% | ~20% |

Figure 2:
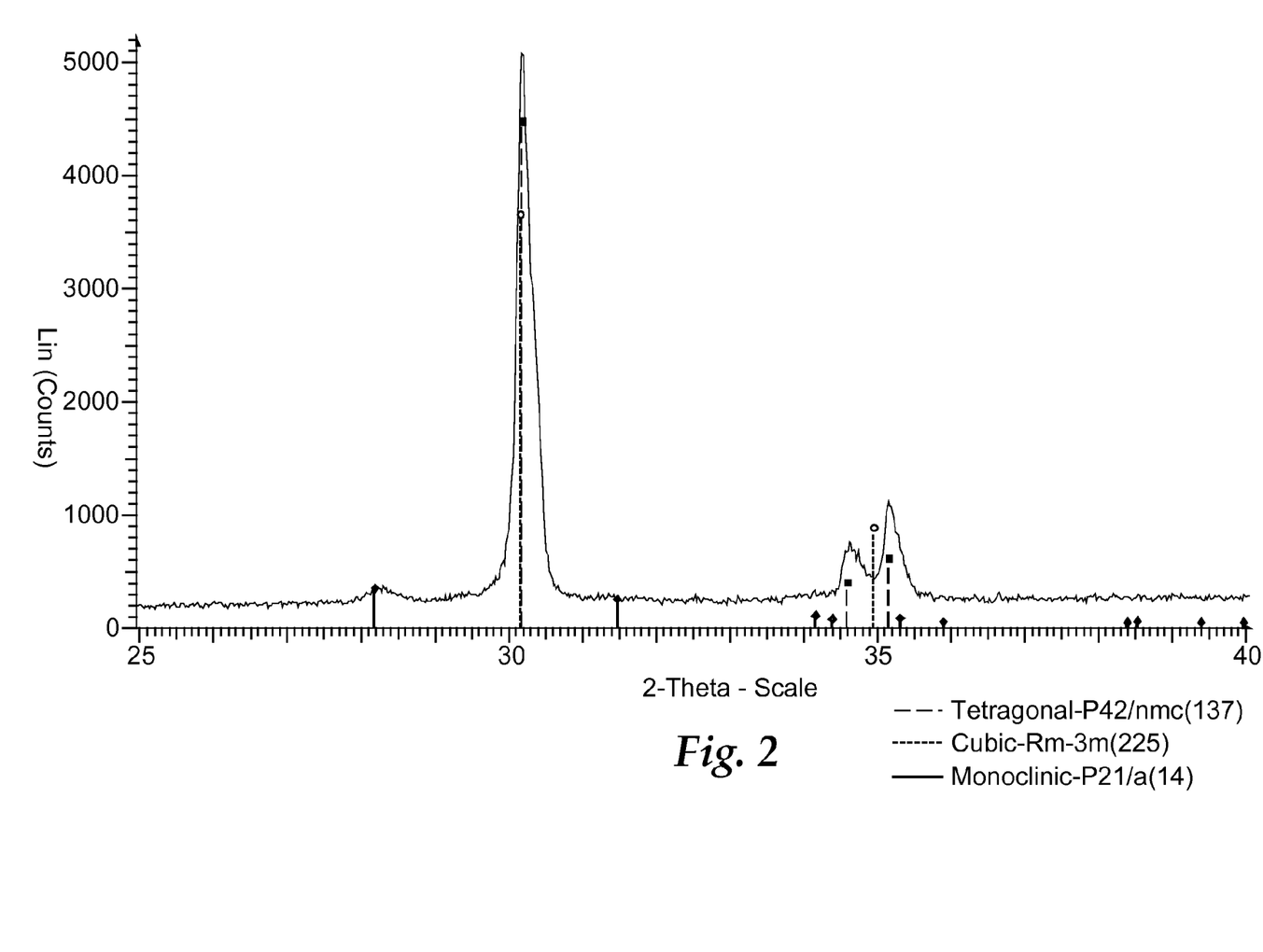
FIG. 2 is a representative x-ray diffraction pattern of a comparative zirconia bead having tetragonal zirconia as the major phase of its outer surface's crystalline phase composition.

An x-ray diffraction pattern analysis was also carried out on the zirconia beads prior to doping. The results are shown in FIG. 2, indicating tetragonal zirconia (85%) as the major phase of the beads' outer surface, along with 15% monoclinic zirconia.

Figure 4:
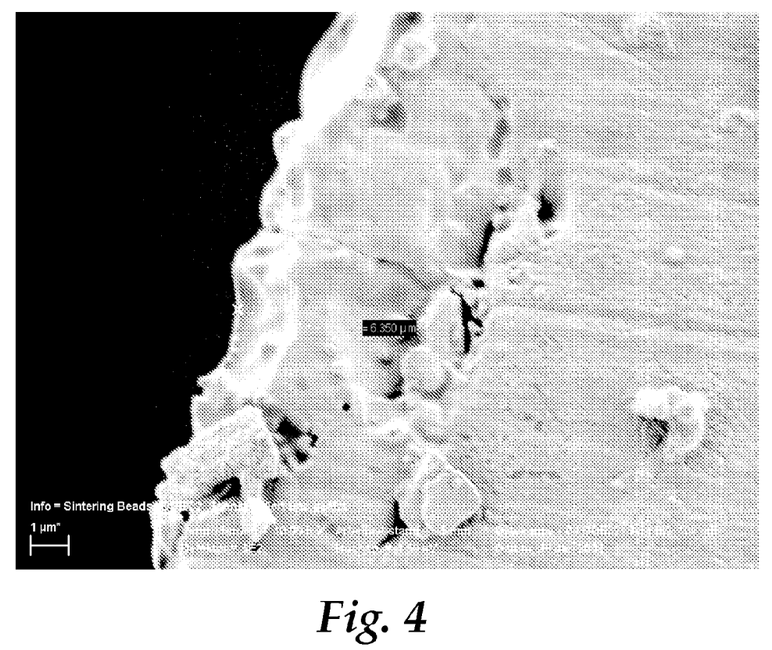
FIG. 4 is an SEM image of a cross-section of an exemplary zirconia support with a calcium-doped outer surface.

An SEM image of a cross-section of a representative bead with the CaO concentration of 0.55 weight percent was obtained and is shown in FIG. 4. The calcium-doped outer surface was found to have a thickness of about 6 micrometers. SEM images of cross-sections of representative beads with the CaO concentrations of 0.1 and 1.0 were also obtained. The calcium-doped outer surfaces of these were found to have thicknesses of about 4 micrometers and about 12 micrometers, respectively.

Example 7-9

Preparation of Sintering Support Beads with Calcium Acetate

Aqueous solutions of calcium acetate were prepared by dissolving 0.16 g, 0.87 g, and 1.59 g $Ca(O(O)CCH_3)_2.1 H_2O$ in 20 mL of deionized water. Each solution was then mixed with 50 g of tetragonal zirconia beads having an average diameter of 1 mm (YTZ zirconia grinding media, produced from yttria-stabilized zirconia powder by Nikkato Corporation, Japan). The resulting concentrations of Ca, calculated as CaO, in each mixture was 0.10, 0.55, and 1.0 percent by weight, respectively, based upon the mass of the beads. The corresponding CaO concentrations in mole percent were 0.22, 1.20, and 2.20, respectively.

The solvent in each mixture was evaporated by heating at 90° C. in a drying oven for 2.5 hours, during which time the drying procedure was interrupted 5 times for 30 s for additional mixing by hand to keep the calcium chloride homogeneously distributed on the bead surfaces. The resulting dried mixture was screened (2 mm screen) and transferred to an alumina crucible. The resulting dried calcium chloride coated beads from each mixture were sintered at 1500° C. for 120 minutes. During sintering, a phase transformation at the bead surfaces took place and a large grain growth occurred. After sintering, the beads were separated from each other by crunching with a pestle and then screened (2 mm screen).

Each of the resulting batches of doped beads was evaluated for any remaining sintering activity by subjecting the beads to another sintering at 1500° C. for 120 minutes. No sintering activity was indicated when the resulting beads were free flowing, and no bead agglomerates were observed. The presence of bead agglomerates was determined by pouring the beads of 1 mm diameter through a sieve with a mesh size of 2 mm. Beads with a CaO concentration of 0.10 weight percent showed a minor amount of agglomerates. No agglomerates were observed in the beads with the CaO concentrations of 0.55 and 1.0 weight percent.

SEM images of cross-sections of representative beads with the CaO concentrations of 0.1, 0.55, and 1.0 were obtained. The calcium-doped outer surfaces of these were found to have thicknesses of about 2 micrometers, about 5 micrometers, and about 3 micrometers, respectively.

The complete disclosures of any patents, patent documents and publications cited herein are incorporated by reference in their entirety as if each were individually incorporated. In case of conflict, the present specification, including definitions, shall control. Various modifications and alterations to this invention will become apparent to those skilled in the art without departing from the scope and spirit of this invention. Illustrative embodiments and examples are provided as examples only and are not intended to limit the scope of the present invention. The scope of the invention is limited only by the claims set forth as follows.

What is claimed is:

1. A sintering support comprising a fully stabilized zirconia outer surface;
   wherein the sintering support withstands sintering a ceramic part in contact with the outer surface without adhesion between the outer surface and the ceramic part;
   wherein the sintering support is selected from the group consisting of a plurality of rods and a plurality of beads;
   wherein at least the stabilized zirconia outer surface comprises a crystalline phase composition, at least 40 percent by weight of which is a stabilized zirconia-containing crystalline phase;
   wherein the stabilized zirconia-containing crystalline phase contains at least one stabilizing element in an amount sufficient to stabilize the zirconia-containing crystalline phase at the outer surface;
   wherein the stabilized zirconia-containing crystalline phase is selected from the group consisting of a cubic zirconia structure, a pyrochlore structure, a perovskite structure, and a combination thereof; and
   wherein the cubic zirconia structure is stabilized by CaO, MgO, SrO, BaO, or a combination thereof.

2. The sintering support of claim 1, wherein the sintering is at a temperature from 1300° C. to 1600° C.

3. The sintering support of claim 1, wherein the perovskite structure includes $CaZrO_3$, $MgZrO_3$, $SrZrO_3$, $BaZrO_3$, or a combination thereof.

4. The sintering support of claim 1, wherein at least the stabilized zirconia outer surface comprises a crystalline phase composition, wherein greater than 80 percent by weight of the crystalline phase composition is the stabilized zirconia-containing crystalline phase.

5. The sintering support of claim 1, wherein the stabilized zirconia-containing crystalline phase comprises cubic zirconia stabilized by CaO, MgO, SrO, BaO, or a combination thereof.

6. The sintering support of claim 1, wherein the stabilized zirconia outer surface has a grain size greater than 1 micrometer.

7. The sintering support of claim 1, wherein the stabilized zirconia outer surface comprises at least 5 mole percent of the at least one stabilizing element, based upon the total moles of zirconia in the composition of the outer surface.

8. The sintering support of claim 7, wherein the at least one stabilizing element is selected from the group consisting of Ca, Mg, Sr, Ba, Sc, and a combination thereof.

9. The sintering support of claim 1, wherein the stabilized zirconia outer surface is essentially free of any contaminating element.

10. The sintering support of claim 9, wherein the contaminating element is selected from the group consisting of iron, manganese, vanadium, cobalt, copper, nickel, and combinations thereof.

11. The sintering support of claim 1, wherein the support is a plurality of beads.

12. The sintering support of claim 11, wherein the at least one stabilizing element is present in the outer surface in an amount of at least 0.10 percent by weight of the beads.

13. The sintering support of claim 11, wherein the beads have a diameter of at least 0.5 mm.

14. The sintering support of claim 13, wherein the beads have a diameter of not more than 3 mm.

15. The sintering support of claim 11, wherein the beads are substantially spherical.

16. A method of preparing a sintering support of claim 1, the method comprising:
    providing a zirconia base having an outer surface;
    contacting the outer surface of the zirconia base with a solution of a precursor of at least one stabilizing element in a solvent;
    evaporating the solvent to provide the zirconia base having the outer surface coated with the precursor of the at least one stabilizing element; and
    sintering the zirconia base having the outer surface coated with the precursor of the at least one stabilizing element at a temperature of at least 1200° C. to provide a sintering support comprising a fully stabilized zirconia outer surface.

17. The method of claim 16, wherein the precursor is selected from the group consisting of a salt, an alcoholate, a base, an acid, a sol, or a combination thereof; and wherein the precursor comprises the at least one stabilizing element, wherein the precursor is dissolved or dispersed in the solvent, and wherein the solvent is water, an organic solvent, or a combination thereof.

18. The method of claim 16, wherein the at least one stabilizing element is selected from the group consisting of Ca, Mg, Sr, Ba, Y, Sc, a lanthanide, and a combination thereof.

19. The method of claim 16, wherein the precursor is selected from the group consisting of a soluble calcium-containing compound, magnesium chloride, lanthanum nitrate, cerium oxide sol, yttrium oxide sol, and a combination thereof.

20. The method of claim 19, wherein the precursor comprises a soluble calcium salt.

21. The method of claim 16, wherein at least 40 percent by weight of the crystalline phase composition is stabilized zirconia-containing crystalline phase of cubic zirconia crystal structure.

22. The method of claim 16, wherein, after sintering, the outer surface has a grain size greater than 1 micron.

23. The method of claim 16, wherein the outer surface is essentially free of any contaminating element.

* * * * *